(12) United States Patent
Fink et al.

(10) Patent No.: US 8,240,708 B2
(45) Date of Patent: Aug. 14, 2012

(54) SIDE CURTAIN AIRBAG WITH FABRIC DIFFUSER

(75) Inventors: Michael Fink, Mesa, AZ (US); Ryan T. Pinsenschaum, Dayton, OH (US); Douglas S. Weston, Tipp City, OH (US); Dayne B. Hassett, Sandy, UT (US); Brian Abraham, Fairborn, OH (US); Ever E. Luna, Juarez (MX); Raul A. Hernandez, Juarez (MX)

(73) Assignee: Nxgen Technologies, LLC, Meza, AZ (US)

( * ) Notice: Subject to any disclaimer, the term of this patent is extended or adjusted under 35 U.S.C. 154(b) by 0 days.

(21) Appl. No.: 12/780,411

(22) Filed: May 14, 2010

(65) Prior Publication Data

US 2011/0057424 A1    Mar. 10, 2011

Related U.S. Application Data

(63) Continuation-in-part of application No. 11/190,499, filed on Jul. 26, 2005, now Pat. No. 7,784,822, and a continuation-in-part of application No. 12/256,224, filed on Oct. 22, 2008, now Pat. No. 7,971,899.

(60) Provisional application No. 61/178,755, filed on May 15, 2009.

(51) Int. Cl.
*B60R 21/16* (2006.01)
(52) U.S. Cl. .................................................. 280/730.2
(58) Field of Classification Search .................. 280/729, 280/730.2, 736, 740, 742
See application file for complete search history.

(56) References Cited

U.S. PATENT DOCUMENTS 5,348,342 A    9/1994 Haland et al.
(Continued)

FOREIGN PATENT DOCUMENTS

EP    1462321 A1    9/2004
(Continued)

OTHER PUBLICATIONS

Translation to JP2003-025946.

*Primary Examiner* — Paul N Dickson
*Assistant Examiner* — Robert A Coker
(74) *Attorney, Agent, or Firm* — Cantor Colburn LLP

(57) ABSTRACT

An inflatable cushion for a side of a vehicle, the inflatable cushion having: a first cushion section formed from a first sheet of material secured to a second sheet of material, the first cushion section having a plurality of separate inflatable cells each of which having an inlet opening for receipt of an inflation gas; an internal passageway formed in the first cushion section, the internal passageway linking and fluidly coupling to each of the plurality of separate inflatable cells via the inlet opening of each of the plurality of separate inflatable cells, the internal passageway being formed by an upper portion of the first sheet of material and an upper portion of the second sheet of material; a fabric diffuser member secured in the internal passageway, the fabric diffuser member being configured to supply the inflation gas to each of the plurality of separate inflatable cells; and means for restricting fluid flow between the plurality of inflatable cells by limiting fluid flow between an exterior portion of the fabric diffuser member and an interior surface of the internal passageway proximate to an edge of the inlet openings of the plurality of inflatable cells.

20 Claims, 8 Drawing Sheets

U.S. PATENT DOCUMENTS

| | | | |
|---|---|---|---|
| 5,378,019 A | 1/1995 | Smith et al. | |
| 5,421,610 A | 6/1995 | Kavanaugh et al. | |
| 5,788,270 A | 8/1998 | Haland et al. | |
| 5,992,881 A | 11/1999 | Faigle | |
| 6,010,149 A | 1/2000 | Riedel et al. | |
| 6,073,961 A | 6/2000 | Bailey et al. | |
| 6,099,029 A | 8/2000 | Haland et al. | |
| 6,135,493 A | 10/2000 | Jost et al. | |
| 6,152,481 A | 11/2000 | Webber et al. | |
| 6,164,688 A | 12/2000 | Einsiedel et al. | |
| 6,170,860 B1 | 1/2001 | Denz et al. | |
| 6,199,898 B1 * | 3/2001 | Masuda et al. | 280/730.2 |
| 6,220,629 B1 | 4/2001 | Wipasuramonton et al. | |
| 6,237,937 B1 | 5/2001 | Kokeguchi et al. | |
| 6,293,581 B1 | 9/2001 | Saita et al. | |
| 6,312,009 B1 | 11/2001 | Haland et al. | |
| 6,325,409 B1 | 12/2001 | Fischer | |
| 6,334,625 B1 | 1/2002 | Pausch et al. | |
| 6,378,895 B1 | 4/2002 | Brucker et al. | |
| 6,394,487 B1 | 5/2002 | Heudorfer et al. | |
| 6,402,190 B1 | 6/2002 | Heudorfer et al. | |
| 6,402,192 B2 | 6/2002 | Haland et al. | |
| 6,409,211 B1 | 6/2002 | Sheng et al. | |
| 6,431,589 B1 | 8/2002 | Heigl et al. | |
| 6,450,529 B1 | 9/2002 | Kalandek et al. | |
| 6,457,742 B1 | 10/2002 | Brucker | |
| 6,467,802 B2 | 10/2002 | Heigl | |
| 6,481,743 B1 | 11/2002 | Tobe et al. | |
| 6,494,480 B2 | 12/2002 | Haland et al. | |
| 6,502,857 B2 | 1/2003 | Nakanishi et al. | |
| 6,530,595 B2 * | 3/2003 | Masuda et al. | 280/730.2 |
| 6,543,806 B1 | 4/2003 | Fink | |
| 6,554,314 B1 | 4/2003 | Uchiyama et al. | |
| 6,595,546 B2 | 7/2003 | Smith | |
| 6,616,179 B2 | 9/2003 | Tanase et al. | |
| 6,623,031 B2 | 9/2003 | Haland et al. | |
| 6,715,786 B1 | 4/2004 | Willibey | |
| 6,726,243 B2 | 4/2004 | Dinsdale et al. | |
| 6,749,220 B1 | 6/2004 | Wipasuramonton et al. | |
| 6,755,436 B2 | 6/2004 | Hess et al. | |
| 6,779,562 B2 | 8/2004 | Tietze | |
| 6,860,507 B2 | 3/2005 | Uchiyama et al. | |
| 6,913,282 B2 | 7/2005 | Takahashi | |
| 6,945,556 B2 | 9/2005 | Maertens | |
| 6,962,364 B2 | 11/2005 | Ju et al. | |
| 7,032,622 B2 * | 4/2006 | Kitamura et al. | 138/126 |
| 7,431,332 B2 | 10/2008 | Wipasuramonton et al. | |
| 7,458,606 B2 * | 12/2008 | Charpentier | 280/730.2 |
| 7,648,162 B2 * | 1/2010 | Brough et al. | 280/730.2 |
| 7,654,567 B2 * | 2/2010 | Taylor et al. | 280/740 |
| 8,007,002 B2 * | 8/2011 | Kalandek et al. | 280/740 |
| 2001/0026062 A1 | 10/2001 | Kosugi et al. | |
| 2002/0024203 A1 | 2/2002 | Takahashi | |
| 2002/0101066 A1 | 8/2002 | Tanase et al. | |
| 2002/0105174 A1 | 8/2002 | Tanase et al. | |
| 2002/0149180 A1 | 10/2002 | Keshavaraj | |
| 2002/0195804 A1 | 12/2002 | Hess et al. | |
| 2003/0124929 A1 | 7/2003 | Hurst et al. | |
| 2003/0178829 A1 | 9/2003 | Dinsdale et al. | |
| 2003/0230876 A1 | 12/2003 | Ohrvall et al. | |
| 2004/0104561 A1 | 6/2004 | Maertens | |
| 2004/0108694 A1 | 6/2004 | Takahashi | |
| 2004/0239082 A1 | 12/2004 | Schneider et al. | |
| 2004/0242098 A1 | 12/2004 | Bass | |
| 2005/0146118 A1 | 7/2005 | Kitamura et al. | |
| 2006/0001244 A1 * | 1/2006 | Taguchi et al. | 280/729 |
| 2006/0017267 A1 | 1/2006 | Fink | |
| 2006/0108776 A1 | 5/2006 | Bradbum | |
| 2006/0119084 A1 * | 6/2006 | Coon et al. | 280/730.2 |
| 2007/0237961 A1 | 10/2007 | Li et al. | |
| 2008/0084052 A1 | 4/2008 | Abney et al. | |
| 2009/0212540 A1 * | 8/2009 | Kamiyama | 280/729 |

FOREIGN PATENT DOCUMENTS

| | | |
|---|---|---|
| GB | 2395170 A | 5/2004 |
| JP | 11301394 A | 11/1999 |
| JP | 11314555 A | 11/1999 |
| JP | 2000296749 | 10/2000 |
| JP | 2000296750 | 10/2000 |
| JP | 2000296751 | 10/2000 |
| JP | 2000296752 | 10/2000 |
| JP | 2000296753 | 10/2000 |
| JP | 2000296754 | 10/2000 |
| JP | 2001328505 A | 11/2001 |
| JP | 2002067861 A | 3/2002 |
| JP | 2002067863 A | 3/2002 |
| JP | 2003072504 | 3/2002 |
| JP | 2002316609 A | 10/2002 |
| JP | 2003025946 A | 1/2003 |
| JP | 2003306118 | 10/2003 |
| JP | 2007223373 | 9/2007 |
| WO | 03/101791 A1 | 12/2003 |
| WO | 2005039938 A1 | 5/2005 |

* cited by examiner

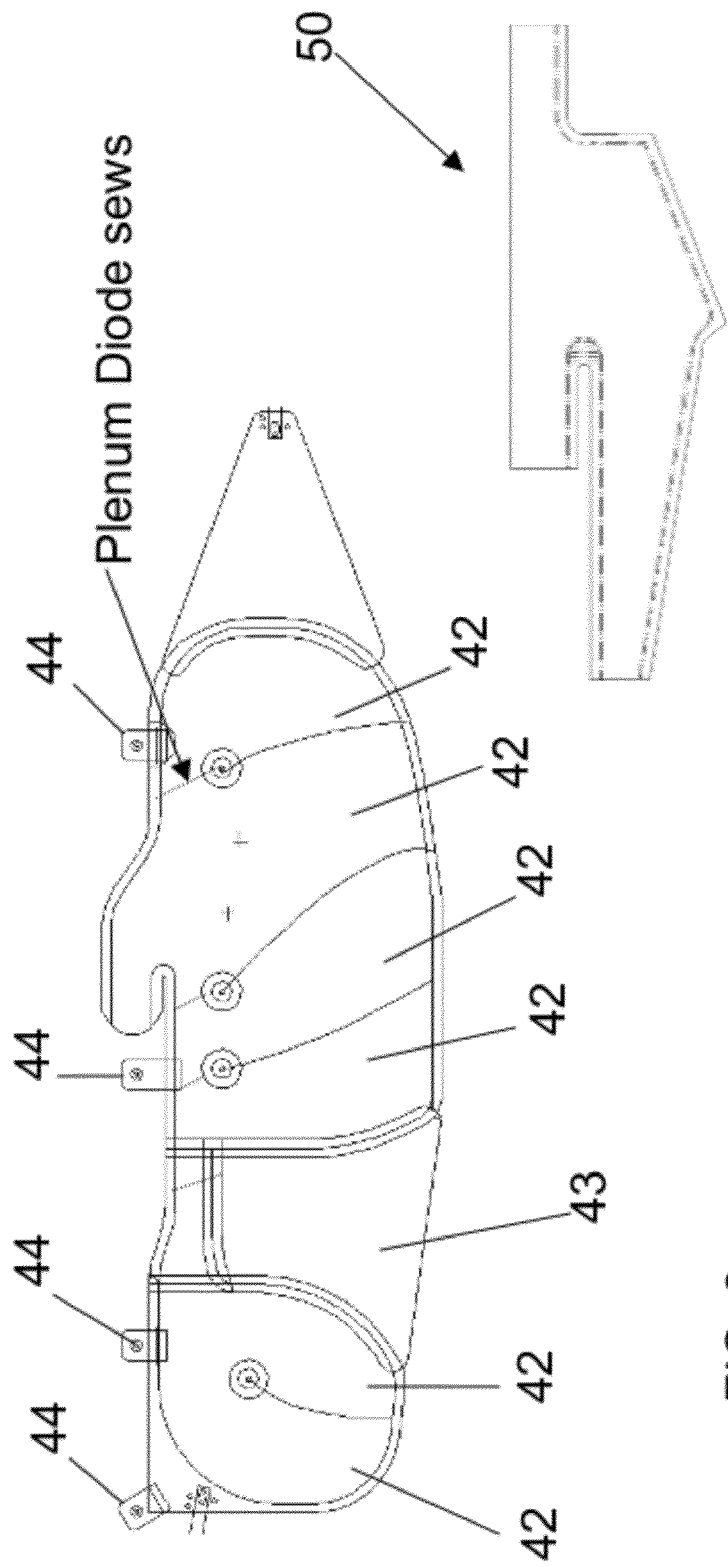

- Flexible fabric plenum Objective
  - Seal as much as possible each cells and distribute properly air flow

Flexible fabric plenum Concept

- The flexible fabric plenum consists of air flow holes with a specified amount of holes and diameter for each cell and a certain height of diode
- The height of diode, # of vent holes and diameter of holes would depend on air flow distribution feeding time and inflation volume area.
- The flexible fabric plenum is sewn into the two LH and RH Pattern with straight vertical sew lines (the amount of sew lines will depend on the numbers of cushion cells

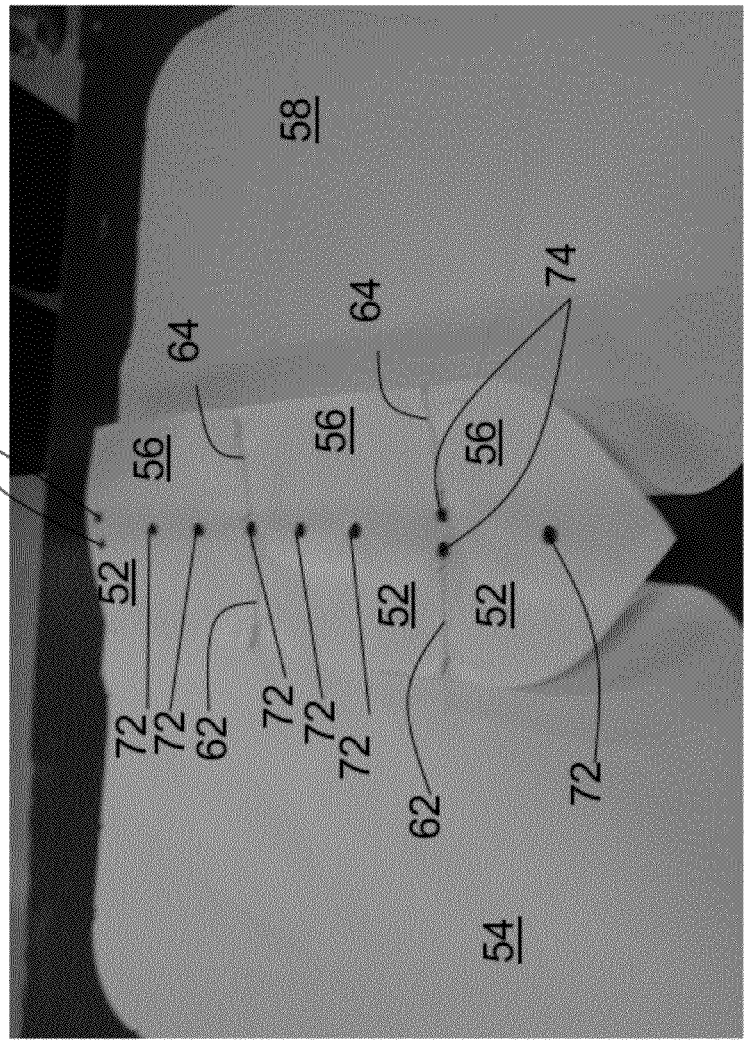

FIG. 5

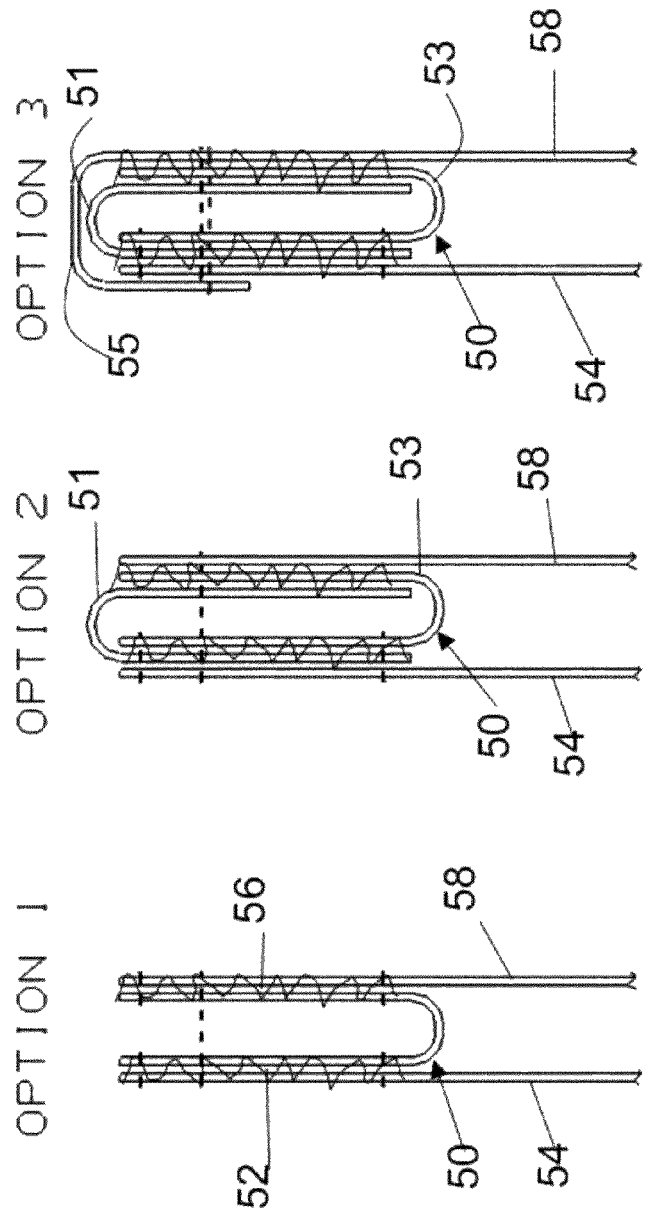

SIDE CURTAIN AIRBAG WITH FABRIC DIFFUSER

CROSS REFERENCE TO RELATED APPLICATIONS

This application claims the benefit of U.S. Provisional Patent Application Ser. No. 61/178,755 filed May 15, 2009, the contents of which are incorporated herein by reference thereto.

This application is also a continuation-in-part of U.S. Non-Provisional patent application Ser. No. 11/190,499 filed Jul. 26, 2005 and U.S. Non-Provisional patent application Ser. No. 12/256,224 filed Oct. 22, 2008 the contents each of which are incorporated herein by reference thereto.

BACKGROUND

Exemplary embodiments of the present invention relate generally to a side impact or rollover inflatable curtain airbag and more specifically to apparatus and methods for deploying the same.

Various side impact or rollover airbags (also referred to as side curtains or curtain airbags) provide a cushion between a side of a vehicle and the occupant. Side curtain airbags generally deploy downward from a stowed position within the roofline of vehicle and inflate between the occupant and the vehicle interior side structure, such as the side windows and the A, B and/or C pillars.

A side curtain airbag generally consists of two fabric panels either sewn or interwoven together to create a plurality of inflatable cells. These cells are inflated during a predetermined activation event wherein a signal is provided to inflate the side curtain airbag. A side curtain may have a plurality of cells in various arrangements and/or configurations.

Typical airbag curtain designs have an "open flow" between chamber cells. Open flow as described herein is characterized by the gas or fluid within a cell having open fluid communication with adjacent cells via a diffuser tube and/or fluid paths disposed about the diffuser tube proximate to adjacent cells. This configuration allows the gas to uniformly fill the entire airbag because the gas distributes among all or most of the airbag cells or inflated regions. An example of an open flow conventional airbag is disclosed in FIG. 2 of U.S. Pat. No. 6,481,743 to Tobe et al., the entire disclosure of which is herein fully incorporated by reference.

In some applications, it is desirable to provide a side impact or rollover restraint system having an inflatable curtain airbag that does not have "open flow" between chamber cells.

SUMMARY OF THE INVENTION

Thus in accordance with exemplary embodiments of the present invention there is provided an inflatable cushion for a side of a vehicle.

In one exemplary embodiment, an inflatable cushion for a side of a vehicle is provided, the inflatable cushion having: a first cushion section formed from a first sheet of material secured to a second sheet of material, the first cushion section having a plurality of separate inflatable cells each of which having an inlet opening for receipt of an inflation gas; an internal passageway formed in the first cushion section, the internal passageway linking and fluidly coupling to each of the plurality of separate inflatable cells via the inlet opening of each of the plurality of separate inflatable cells, the internal passageway being formed by an upper portion of the first sheet of material and an upper portion of the second sheet of material; a fabric diffuser member secured in the internal passageway, the fabric diffuser member being configured to supply the inflation gas to each of the plurality of separate inflatable cells; and means for restricting fluid flow between the plurality of inflatable cells by limiting fluid flow between an exterior portion of the fabric diffuser member and an interior surface of the internal passageway proximate to an edge of the inlet openings of the plurality of inflatable cells.

BRIEF DESCRIPTION OF THE DRAWINGS

FIG. 2 is a view of an inflatable cushion in accordance with an exemplary embodiment of the present invention;

FIG. 3 is a view of a fabric plenum in accordance with an exemplary embodiment of the present invention;

FIGS. 4 and 5 are view of partially assembly inflatable cushions in accordance with an exemplary embodiment of the present invention;

FIG. 9 illustrates views of alternative configurations of exemplary embodiments of the present invention.

DETAILED DESCRIPTION OF THE PREFERRED EMBODIMENTS

Reference will now be made in detail to exemplary embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
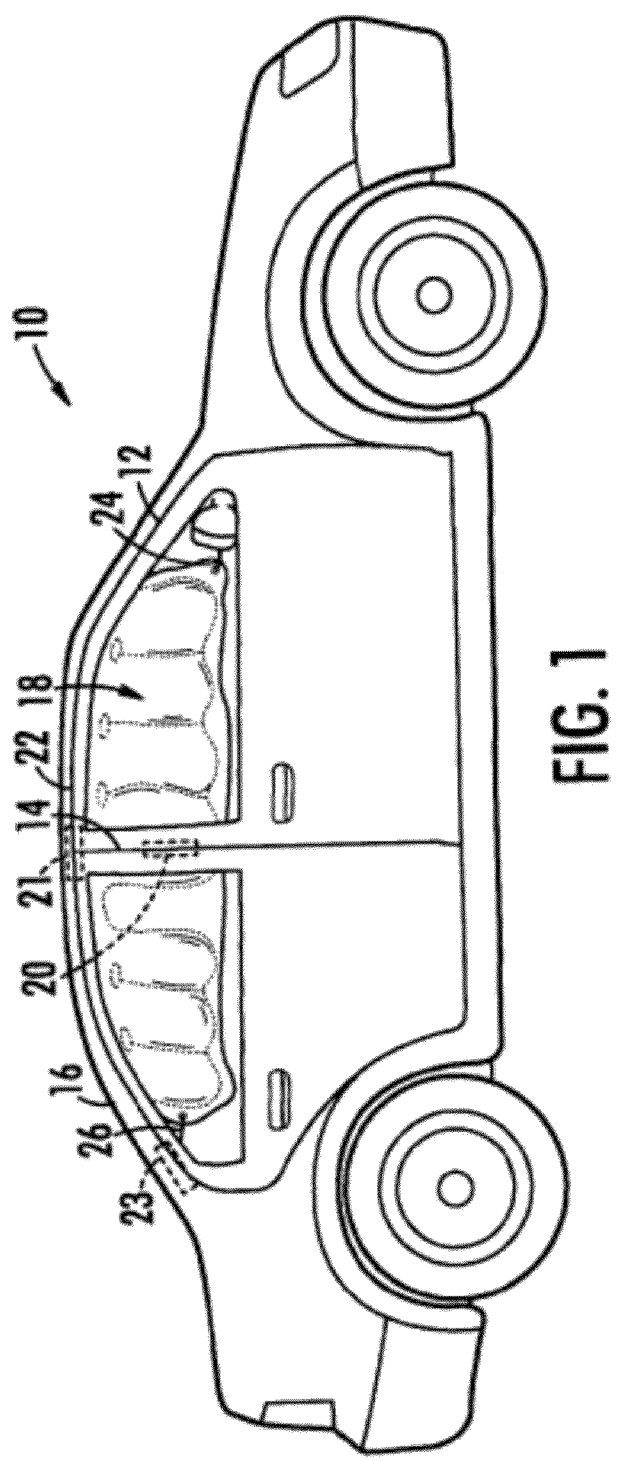
FIG. 1 is a side view of a vehicle with an inflated side curtain airbag.
Figure 4:
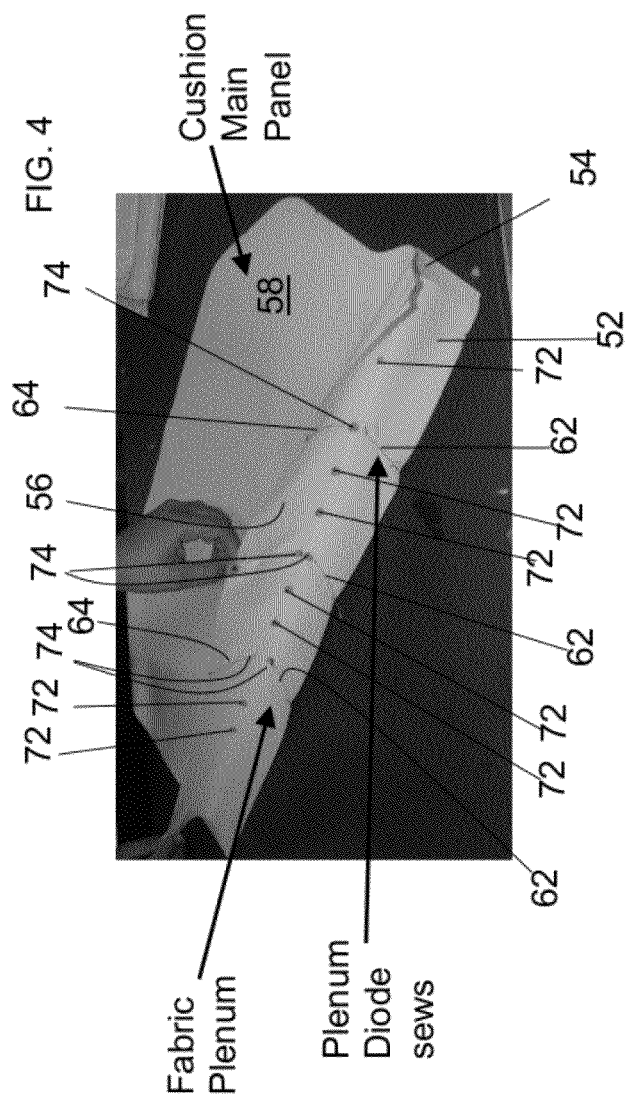
Figure 6:
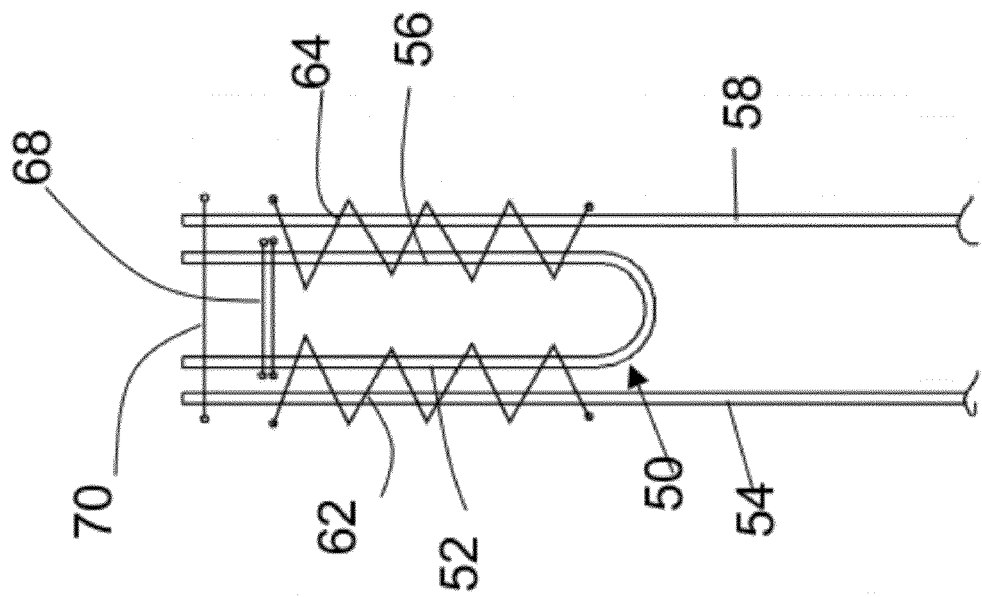
FIG. 6 is a view illustrating securement of the fabric plenum to an inflatable cushion.

Referring to the drawings and particularly to FIG. 1, a vehicle 10 is shown. Vehicle 10 includes an A-pillar 12, a B-pillar 14, and a C-pillar 16. A side curtain airbag or inflatable cushion 18 in accordance with one exemplary embodiment of the present invention is illustrated and extends between A-pillar 12 and C-pillar 16. In FIG. 1, airbag 18 is shown in an inflated state. In this regard, an inflator 20 provides a gas necessary to inflate airbag 18. Inflators 20, 21 and 23 are shown in dashed lines to display alternative locations for the inflator. Thus, the inflator may be located in the B-pillar, in the C-pillar, in the roof, or in another suitable location within vehicle 10.

Before airbag 18 is deployed, it may be stored within roof rail 22 of vehicle 10. Optionally, tethers 24 and 26 may be used to restrain airbag 18. In the embodiment shown in FIG. 1, tethers 24 and 26 attach at one end to airbag 18 and at the other end to the body of the vehicle.

Referring now to FIG. 2, further details of side curtain airbag or inflatable cushion 18 can be most easily explained. Airbag 18 includes a plurality of substantially isolated cells 42. Cells 42 can be configured to a rear bank of cells between B-pillar 14 and C-pillar 16, while other cells 42 make up a front bank of cells between A-pillar 12 and B-pillar 14. An area 43 is not inflated because an occupant is less likely to come into contact with that area. In some embodiments, however, area 43 may be a cell, or may inflate at a time later than the other cells.

Continuing to refer to FIG. 2, another configuration of an inflatable cushion or airbag 18 is illustrated here tabs 44 are provided in this embodiment to attach airbag 18 to roof rail 22. Instead of tabs 44, any suitable method of attachment may be used.

In order to provide gas from the inflator to the cells of the inflatable cushion a fabric diffuser or fabric plenum 50 is provided. FIG. 3 shows one non-limiting embodiment of a fabric diffuser or fabric plenum 50.

In accordance with exemplary embodiments of the present invention, fabric plenums have been shown to be a viable technique to take gas from an inflator, segment the gas from the inflator and distribute to all parts of the cushion, and reduce mass. In an exemplary embodiment, the fabric plenum(s) are used to replace other types of diffuser tubes such as plastic or metal diffuser tubes.

Referring now to FIGS. 1-9, the fabric plenum is a sewn plenum made from flat fabric and can be integrated into the cushion or free to float. Each cell of the cushion is segmented from the others with relatively very little gas passing from one cell to the next. The fabric plenum is configured to supply the inflation gas from the inflator to the cells of the inflatable cushion, wherein only a limited amount of inflation gas is transferred from cell to cell.

This is accomplished by sewing a first side or first portion 52 of the plenum or diffuser to a first sheet of material 54 of the cushion and a second portion or side 56 of the plenum to second sheet of material 58 of the cushion. The gas can be essentially shut off from adjacent cells by sewing the diode circles or semi-circular patterns 60 to the first and second sheet of the inflatable cushion as well as plenum diode sews wherein the first portion of the plenum is stitched directly to the first sheet by vertical stitches 62 and the second portion of the plenum is stitched directly to the second sheet by vertical stitches 64 or this approach can be used to just partially close off the communication between cells by not sewing the diode circles and half moon closeouts into the plenum.

Thereafter the plenum is closed by securing the first portion 52 to the second portion 54 by stitches 68 that only secure the first portion of the plenum to the second portion of the plenum and then the upper portion of the first sheet of material are secured to the upper portion of the second sheet of material via stitches 70.

Figure 7:
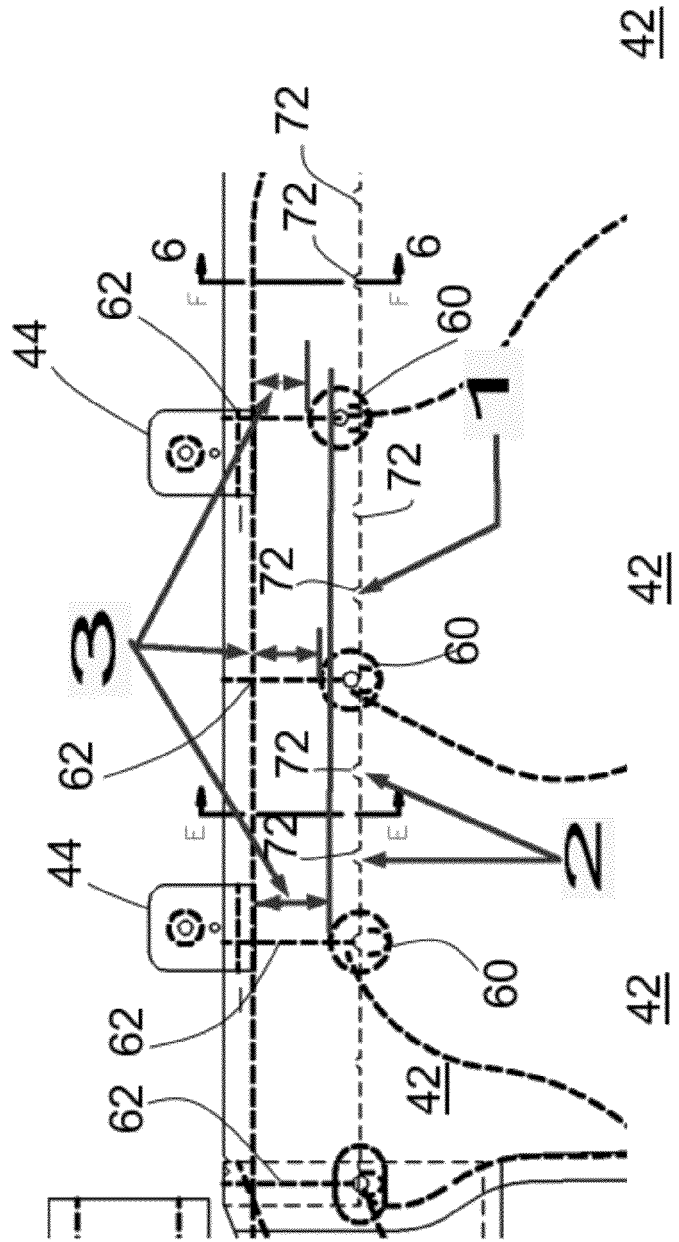
FIGS. 7 and 8 are views of illustrating an inflatable cushion with a fabric plenum in accordance with an exemplary embodiment of the present invention.
Figure 8:
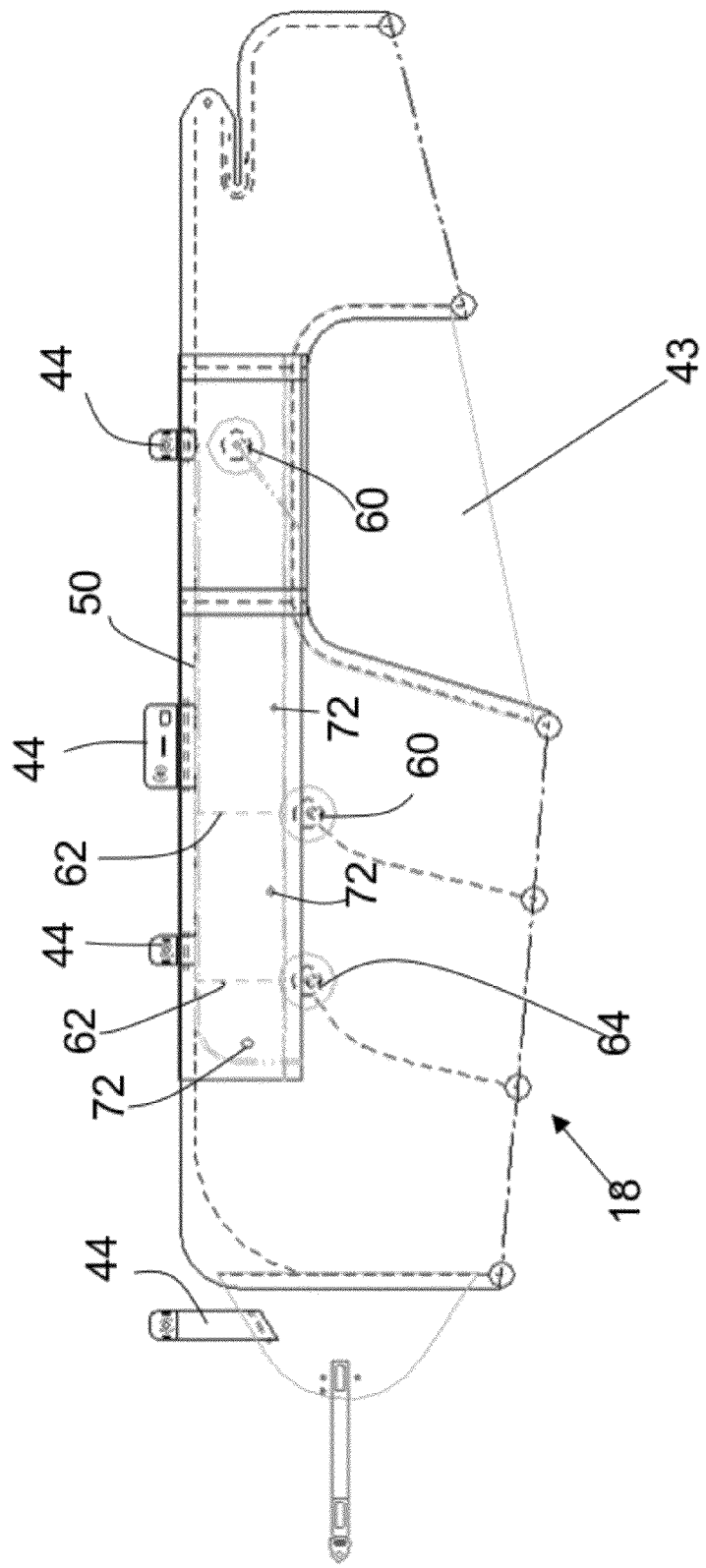

The flexible fabric plenum will also have air flow holes 72 with a specified amount of holes and diameter for each cell and a certain height of diode, which is shown in FIG. 7.

The height of diode, number of vent holes 72 and diameter of holes would depend on air flow distribution feeding time and inflation volume area. Other holes 74 are illustrated in the attached FIGS. although holes 74 are solely provided as locating features for placement of the vertical sew lines 62 and 64 as inflation gas is not intended to pass through holes or openings 74.

The flexible fabric plenum is sewn into the two sides with straight vertical or substantially vertical sew lines 62 and 64 (the amount of sew lines will depend on the numbers of cushion cells).

FIG. 9 shows alternative plenum configurations. In some embodiments the plenum sewing will increase the time that the cushion will remain inflated since there will be at least four separate piles or stitches sewn together at the top of the inflatable cushion.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An inflatable cushion for a side of a vehicle, the inflatable cushion, comprising:
    a first cushion section formed from a first layer of material secured to a second layer of material, the first cushion section having a plurality of separate inflatable cells each of which having an inlet opening for receipt of an inflation gas;
    an internal passageway formed in the first cushion section, the internal passageway linking and fluidly coupling to each of the plurality of separate inflatable cells via the inlet opening of each of the plurality of separate inflatable cells, the internal passageway being formed by an upper portion of the first layer of material and an upper portion of the second layer of material;
    a fabric diffuser member secured in the internal passageway, the fabric diffuser member being configured to supply the inflation gas to each of the plurality of separate inflatable cells; and
    means for restricting fluid flow between the plurality of inflatable cells by limiting fluid flow between an exterior portion of the fabric diffuser member and an interior surface of the internal passageway proximate to an edge of the inlet openings of the plurality of inflatable cells, wherein each of the plurality of inflatable cells are segmented from each other and only a limited amount of inflation gas is transferred from cell to cell.

2. The inflatable cushion as in claim 1, wherein the means for restricting fluid flow between an exterior portion of the fabric diffuser member and an interior surface of the internal passageway proximate to an edge of the inlet opening of the plurality of inflatable cells is a plurality of stitches through the first layer of material and the second layer of material below the fabric diffuser; another plurality of stitches securing only the first layer of material to a first portion of the fabric diffuser; and another plurality of stitches securing only the second layer of material to a second portion of the fabric diffuser.

3. The inflatable cushion as in claim 2, wherein the means for restricting fluid flow between an exterior portion of the fabric diffuser member and the interior surface of the internal passageway is a plurality of stitches only securing the first portion of the fabric diffuser to the second portion of the fabric diffuser.

4. The inflatable cushion as in claim 3, wherein the another plurality of stitches securing only the first layer of material to the first portion of the fabric diffuser; and the another plurality of stitches securing only the second layer of material to the second portion of the fabric diffuser are applied prior to the plurality of stitches only securing the first portion of the fabric diffuser to the second portion of the fabric diffuser.

5. The inflatable cushion as in claim 4, wherein an upper edge portion of the first layer of material is secured to an upper edge portion of the second layer of material after the first portion and second portion of the fabric diffuser member are secured to each other.

6. The inflatable cushion as in claim 5, wherein the fabric diffuser has a plurality of outlet openings, wherein at least one of the plurality of outlet opening are aligned with a respective one of the inlet opening of each of the plurality of separate inflatable cells.

7. The inflatable cushion as in claim 1, wherein the inflation gas is supplied directly from the inflator to each of the plurality of inflatable cells through the fabric diffuser during inflation of the inflatable cushion.

8. The inflatable cushion as in claim 1, wherein one end of the fabric diffuser is directly secured to the inflator.

9. The inflatable cushion as in claim 1, wherein each of the plurality of inflatable cells has an inlet opening covered by a portion of the fabric diffuser configured to supply the inflation gas thereto during inflation of the inflatable cushion.

10. The inflatable cushion as in claim 1, wherein the inflation gas is supplied directly from the inflator to each of the plurality of inflatable cells through the fabric diffuser during inflation of the inflatable cushion and wherein one end of the fabric diffuser is directly secured to the inflator and wherein each of the plurality of inflatable cells has an inlet opening covered by a portion of the fabric diffuser configured to supply the inflation gas thereto during inflation of the inflatable cushion.

11. An airbag module for a vehicle, comprising:
    a side curtain inflatable cushion comprising:
        a first cushion section formed from a first layer of material secured to a second layer of material, the first cushion section having a plurality of separate inflatable cells each of which having an inlet opening for receipt of an inflation gas;
        an internal passageway formed in the first cushion section, the internal passageway linking and fluidly coupling to each of the plurality of separate inflatable cells via the inlet opening of each of the plurality of separate inflatable cells, the internal passageway being formed by an upper portion of the first layer of material and an upper portion of the second layer of material;
        a fabric diffuser member secured in the internal passageway, the fabric diffuser member being configured to supply the inflation gas to each of the plurality of separate inflatable cells, wherein each of the plurality of inflatable cells are segmented from each other and only a limited amount of inflation gas is transferred from cell to cell; and
        means for restricting fluid flow between the plurality of inflatable cells by limiting fluid flow between an exterior portion of the fabric diffuser member and an interior surface of the internal passageway proximate to an edge of the inlet openings of the plurality of inflatable cells; and
    an inflator for providing the inflation gas, the inflator being fluidly coupled to the fabric diffuser member.

12. The airbag module as in claim 11, wherein the inflation gas is supplied directly from the inflator to each of the plurality of inflatable cells through the fabric diffuser during inflation of the inflatable cushion.

13. The airbag module as in claim 11, wherein one end of the fabric diffuser is directly secured to the inflator.

14. The airbag module as in claim 11, wherein each of the plurality of inflatable cells has an inlet opening covered by a portion of the fabric diffuser configured to supply the inflation gas thereto during inflation of the inflatable cushion.

15. The airbag module as in claim 11, wherein the inflation gas is supplied directly from the inflator to each of the plurality of inflatable cells through the fabric diffuser during inflation of the inflatable cushion and wherein one end of the fabric diffuser is directly secured to the inflator and wherein each of the plurality of inflatable cells has an inlet opening covered by a portion of the fabric diffuser configured to supply the inflation gas thereto during inflation of the inflatable cushion.

16. A method of securing a fabric diffuser to an inflatable cushion, the method comprising:
    securing a first layer of material only to a first portion of the fabric diffuser;
    securing a second layer of material only to a second portion of the fabric diffuser;
    securing the first portion of the fabric diffuser only to the second portion of the fabric diffuser; and
    securing the first layer of material to the second layer of material to define portions of the inflatable cushion, wherein the inflatable cushion has a plurality of inflatable cells and each of the plurality of inflatable cells are segmented from each other and only a limited amount of an inflation gas supplied from the fabric diffuser to each of the plurality of inflatable cells during inflation of the inflatable cushion is transferred from cell to cell.

17. The method as in claim 16, wherein the inflation gas is supplied directly from an inflator to each of the plurality of inflatable cells through the fabric diffuser during inflation of the inflatable cushion.

18. The method as in claim 16, wherein one end of the fabric diffuser is directly secured to an inflator.

19. The method as in claims 16, wherein each of the plurality of inflatable cells has an inlet opening covered by a portion of the fabric diffuser configured to supply the inflation gas thereto during inflation of the inflatable cushion.

20. The method as in claim 16, wherein the inflation gas is supplied directly from an inflator to each of the plurality of inflatable cells through the fabric diffuser during inflation of the inflatable cushion and wherein one end of the fabric diffuser is directly secured to an inflator and wherein each of the plurality of inflatable cells has an inlet opening covered by a portion of the fabric diffuser configured to supply the inflation gas thereto during inflation of the inflatable cushion.

* * * * *